Patented Aug. 14, 1951

2,564,292

UNITED STATES PATENT OFFICE 2,564,292

POLYMERIZATION OF MONOMERIC VINYL CHLORIDE IN THE PRESENCE OF AQUEOUS ACETIC ACID SOLUTION AND A PEROXYGEN TYPE CATALYST

Robert J. Wolf, Lakewood, Ohio, assignor to The B. F. Goodrich Company, New York, N. Y., a corporation of New York No Drawing. Application July 3, 1948, Serial No. 37,048

3 Claims. (Cl. 260—92.8)

1

The present invention relates to the polymerization of monomeric vinylidene compounds, particularly monomeric vinyl and vinylidene chloride, in the presence of an aqueous acetic acid solution and a peroxygen catalyst. The invention particularly relates to the polymerization of monomeric vinylidene compounds in an aqueous acetic acid medium substantially free of saponaceous dispersing or emulsifying agents so as to produce polymers completely free of emulsifier residues for use in the production of clear plastic materials.

Heretofore the polymerization of monomeric vinylidene compounds, that is, compounds containing a terminal methylene group attached by a double bond to a carbon atom so as to have the following structure $CH_2=C<$, has ordinarily been carried out either in solution in a volatile organic solvent or in aqueous emulsion in the presence of an emulsifying or dispersing agent. However, neither of these methods has been completely satisfactory. Solution polymerization results in the obtainment of polymers of lower molecular weight than is desirable. On the other hand, polymerization in aqueous emulsion in the conventional manner, to obtain either a granular precipitate or a true aqueous dispersion of polymer, involves the use of an emulsifying or dispersing agent which is generally not completely removed from the polymer, with the result that the polymer is cloudy and translucent, rather than clear, and is possessed of electrical properties inferior to those which would be secured if it were possible completely to eliminate the emulsifying or dispersing agent. Consequently, polymers prepared by the conventional emulsion polymerization method have not been entirely suitable for many applications, particularly when it is desired to use the polymer in the preparation of clear plastic stocks or in electrical insulation.

I have now discovered that monomeric vinylidene compounds will polymerize in the presence of aqueous solutions of acetic acid without the presence of emulsifying or dispersing agents to form polymers high in molecular weight and possessed of unique properties. By this method the polymer if insoluble in the acetic acid medium, as is the case with polymers made predominantly from vinyl and vinylidene chloride, is obtained as a fine granular precipitate which is easily filtered and washed, several clear water washes being all that is required to free the polymer of adsorbed acetic acid. The dried polymers so obtained are very white in color and when mixed with plasticizers may be sheeted out or molded into transparent films or plates of surprising clarity. When compounded with plasticizers, clays, carbon black, and other compounding ingredients they may be extruded or molded into electrical insulation of superior electrical resistance.

In the practice of the invention the monomeric material to be polymerized is mixed with an aqueous solution of acetic acid, a peroxygen compound is added to catalyze the polymerization of the monomer and the resulting liquid mixture is then agitated, preferably at a temperature between 0 and 100° C. for a time, generally in the range of 1 to 50 hours, sufficient to bring about polymerization. The monomeric material, depending on its nature, may completely or partially dissolve in the aqueous acetic acid medium and likewise the polymer when formed may precipitate from the aqueous acetic acid medium or remain in solution, but in any event high molecular weight polymers of greatly improved clarity, high strength and excellent electrical properties are secured.

It is preferable to employ monomeric materials which are incompletely soluble in the acetic acid medium and which polymerize to yield insoluble polymers or to adjust the concentration of the acetic acid medium so that the particular monomer is incompletely soluble therein and the polymer is precipitated as formed, for in this event all the advantages of emulsion polymerization, including the obtainment of polymer in finely-divided form and lack of polymer deposition on the walls of the reaction vessel, are secured without the disadvantages resulting from the ordinary presence of emulsifiers. The aqueous acetic acid medium appears to have appreciable emulsifying power on monomers which are incompletely soluble therein for the polymer in such cases is always obtained as a fine uniform granular precipitate. Such granular polymers when mixed with plasticizer are much clearer and free of "fisheyes" (unplasticized particles of polymer) than polymers produced by ordinary aqueous emulsion polymerization.

In polymerization of a monomeric material which is incompletely miscible with the aqueous acetic acid medium and the polymer of which is insoluble therein, a portion of the monomer dissolves in the acetic acid medium where polymerization is initiated, while the unreacted monomer acts as a reservoir from which monomer is absorbed by the aqueous acid medium as polymerization proceeds with the precipitation of polymer. The polymer which precipitates out of solution in the aqueous acetic acid medium is emulsified by the acid medium while further polymerization on the surface of the particle proceeds until a high molecular weight polymer is formed. The polymer precipitate is generally very highly insoluble in the acid polymerization medium because a few water washes after filtration is all that is required to completely free the polymer of residual acid. Thus, a substantially pure polymer is obtained which does not contain electrolytic emulsifier residues and consequently such polymer is clearer and possessed of superior chemical resistance and electrical properties.

The concentration of acetic acid in the aqueous acetic acid polymerization medium may vary from 30 to 99% by weight and the ratio of such acid medium to monomer may be varied from as little as equal parts by weight to as much as 10:1 but, in accordance with the preferred procedure, the concentration of the acid medium and the ratio of acid medium to monomer are preferably controlled so that the monomer is not completely miscible with the acetic acid medium. For example, in the polymerization of vinyl or vinylidene chloride in aqueous acetic acid, these monomers are increasingly soluble in aqueous acetic acid solutions as the acid concentration is increased. However, the polymers and copolymers of these monomers are highly insoluble in the acid medium at all concentrations and as polymerization progresses the polymer is precipitated as a fine white granular solid. Good results in the polymerization of vinyl and/or vinylidene chloride are obtained with the use of a polymerization medium containing from 40 to 80% by weight of acetic acid and with the use of acid to monomer weight ratios of from 1:1 to 6:1. In the polymerization of vinyl chloride the best results are obtained using a 60% acetic acid polymerization medium and acid/monomer ratios of from 2:1 to 4.5:1.

It has been found that the vinylidene compounds are more or less soluble in aqueous acetic acid solutions, for example, a mixture of 10% by weight of vinyl chloride and 90% by weight of 60% acetic acid are completely miscible at 50° C. At the same temperature, a mixture comprising 40% by weight of vinyl chloride is completely miscible with 60% by weight of 80% acetic acid and a mixture comprising 50% by weight of vinyl chloride and 50% by weight of glacial acetic acid are miscible at 50° C. Vinylidene chloride appears to be somewhat less soluble than vinyl chloride in aqueous acetic acid solutions for at 80% acid concentration about 30% by weight of vinylidene chloride is dissolved at room temperature and at 90% acid concentration vinylidene chloride is miscible with equal parts of the acid medium. Vinylidene compounds which are hydrocarbons are generally less soluble in acetic acid than are those which contain halogen or oxygen. For example, at 80% acetic acid concentration only about 5 to 10% of butadiene-1,3 is dissolved. At 85% acid concentration from 15 to 25% by weight of butadiene is dissolved by the medium and at 95% acid concentration the monomer and acid medium are completely miscible at room temperature. Complete miscibility of mixtures containing equal parts by weight of butadiene-1,3 and vinylidene chloride occurs at about 85% acetic acid concentration at room temperature. It is possible in all cases to achieve rapid polymerization of the foregoing monomeric materials using any of the described concentrations of acid in the polymerization medium. However, it has been observed that when an acetic medium containing less than 30% acetic acid is used, the medium does not exhibit sufficient emulsifying action on the monomer and deposition of polymer on the walls of the reaction vessel usually occurs.

In the polymerization of vinyl or vinylidene chloride or other monomers which are incompletely miscible with aqueous acetic acid solutions and produce polymers insoluble in aqueous acetic acid solutions, a surprising phenomenon is observed. It is found that the molecular weight of the polymer produced is independent of the reaction rate and appears to be dependent only on reaction temperature. As the temperature of reaction is increased the molecular weight of the products decreases. In conventional emulsion polymerization of vinylidene compounds in the presence of the usual emulsifiers it is usual for the molecular weight to be reduced by increasing the reaction rate by the use of increased catalyst concentration. It is possible therefore with the aqueous acetic acid medium to use higher concentrations of catalyst to effect rapid polymerization to produce high molecular weight polymers.

As mentioned above a peroxygen compound is used as catalyst for the polymerization. Catalysts which may be used include oil-soluble organic peroxides, which are preferred, such as o,o'-dichlorobenzoyl peroxide, dibenzoyl peroxide, dicaproyl peroxide, acetyl benzoyl peroxide and the like, other peroxides such as hydrogen peroxide, silver peroxide, etc., and oxygen yielding per salts such as sodium and potassium persulfate, sodium and potassium percarbonate, sodium perborate and others. The polymerization may also be effected in the presence of what is known as oxidation-reduction ("Redox") type catalysts, for example, a combination of one of the above peroxygen catalysts with a reducing agent such as the combination of benzoyl peroxide with a small amount of an iron salt such as ferrous sulfate or the combination of benzoyl peroxide and sodium bisulphite.

The amount of catalyst used is not critical and may be varied within wide limits. For example, as little as 0.01% based on the monomeric material of o,o'-dichlorobenzoyl peroxide is sufficient to bring about a satisfactory reaction while 0.05% based on the monomers of this catalyst will produce a nearly quantitative yield of polymer in as little as 13 hours at 50° C. In general, catalyst concentrations varying from 0.01 to 1% or more may be used while catalyst concentrations of 0.10 to 0.75% are preferred.

The polymerization in aqueous acetic acid solution is preferably carried out in the absence of gaseous or molecular oxygen, though polymerization once-commenced in the presence of oxygen will usually proceed satisfactorily. Accordingly, it is preferred that the polymerization vessel be evacuated before charging the monomeric materials or that it be supplied with an inert atmosphere such as nitrogen before charging of the monomeric material.

The method of this invention is applicable generally to the polymerization of unsaturated compounds containing the $CH_2=C<$ group, that is, vinylidene compounds containing a terminal methylene group attached by a double bond to a carbon atom. Examples of such compounds include vinylidene compounds containing only one carbon to carbon unsaturated bond such as vinyl chloride, vinylidene chloride, styrene, p-chlorostyrene, 3,5-dichlorostyrene, p-methoxy styrene, acrylonitrile, methacrylonitrile, alpha - chloro acrylonitrile, methyl acrylate, ethyl acrylate, methyl methacrylate, butyl ethacrylate, methacrylamide, vinyl methyl ketone, vinyl carbazole, vinyl methyl ether, vinyl acetate, vinyl benzoate, isobutylene, ethylene, and other similar mono-olefinic polymerizable compounds. Other vinylidene compounds containing more than one unsaturated carbon to carbon linkage which may be polymerized in aqueous acetic acid solutions include the conjugated dienes such as butadiene-1,3, isoprene, and other butadiene-1,3 hydrocarbons, chloroprene and 3-cyano butadiene-1,3 as well as trienes such as myrcene and compounds containing olefinic and acetylenic unsaturated carbon to carbon bonds such as vinyl acetylene, vinyl ethynyl diethyl carbinol and the like. The above vinylidene compounds may be copolymerized with one another or with still other unsaturated polymerizable materials such as diethyl maleate, diethyl fumarate, maleic acid or anhydride and others.

It will be understood from the above examples that vinyl compounds are a sub-genus of vinylidene compounds since they contain the characteristic $CH_2=C<$ group, one of the valences being connected to hydrogen to form the (vinyl)

group.

The preferred monomeric materials for use in this invention are the chloroethylenes containing from one to two chlorine atoms on one only of the carbon atoms and having only hydrogen atoms on the remaining carbon atoms, that is, vinyl chloride and vinylidene chloride, either singly or in admixture with each other or in admixture with other monomeric materials containing a single olefinic double bond such as vinyl acetate, vinyl propionate, vinyl cyanide, vinyl benzoate, methyl acrylate, ethyl acrylate, styrene, methyl methacrylate, methyl ethacrylate and others. Best results are obtained with monomeric materials the major proportion of which is vinyl chloride or vinylidene chloride.

The invention will be further described with reference to certain specific examples which present the conditions of temperature and time of reaction, concentrations of acetic acid and catalyst under which best results are obtained, and also pertinent physical properties of the polymers produced. The following specific examples are therefore only illustrative of the invention and are not to be construed as a limitation thereon.

EXAMPLES 1 TO 7

In each of these examples, the following materials were charged to an evacuated stainless steel polymerization vessel which was fitted with a paddle type agitator.

| | Parts by weight |
|---|---|
| Vinyl chloride | 100 |
| Aqueous acetic acid solution (60% acetic acid) | 200 |
| Catalyst — o,o' - Dichlorobenzoyl peroxide | Variable |

Polymerization was then effected in the closed vessel with the results shown in the table.

*Table*

| Example | Temperature of Reaction | Catalyst Concentration, per cent on Vinyl Chloride | Time of Polymerization, Hrs. | Specific Viscosity [1] of Polymer |
|---|---|---|---|---|
| | °C. | | | |
| 1 | 50 | 0.70 | 3.0 | 0.39 |
| 2 | 40 | 0.70 | 8.0 | 0.55 |
| 3 | 40 | 0.35 | 23.5 | 0.63 |
| 4 | 50 | 0.10 | 13.25 | 0.46 |
| 5 | 55 | 0.05 | 13.0 | 0.42 |
| 6 | 55 | 0.02 | 21.0 | 0.44 |
| 7 | 55 | 0.01 | 41.0 | 0.43 |

[1] Ratio of rate of flow through an Ostwald pipette of a solution of the polymer dissolved in nitrobenzene to pure nitrobenzene at 30° C In all the examples presented in the table the polymerization reaction proceeded to substantial completion with yields ranging from 90 to 100%. A surprising phenomenon was observed that in no case did the pressure in the reaction vessel rise to the normal value (100 to 110 p. s. i.) usually observed in the polymerization of vinyl chloride in aqueous emulsion at the same temperatures. In all cases, the pressure of the vinyl chloride initially ranged from 70 to 80 p. s. i. and as the reaction progressed it fell steadily to about 20 p. s. i. when reaction was considered complete. The lower pressure during reaction is believed to be due to solution of a portion of the vinyl chloride in the acetic acid dispersion medium.

The polymer in Examples 1 to 7 was obtained in the form of very fine uniform particles indicating that the acetic acid solution also served to disperse the monomer and polymer. The high molecular weight of the polymeric products indicated that though the polymer was insoluble in the acetic acid solution and was precipitated from solution as fast as formed, the reaction proceeded by reaction with the polymer chains already present rather than by continuous initiation of new polymer chains [a mechanism which probably explains the lower molecular weight of polymers produced in the usual solution polymerization processes].

From the consideration of the table, it is also seen that the molecular weight as evidenced by the specific viscosity (determined by the solution viscosity method of Staudinger whereby the time of efflux from an Ostwald pipette of a 20% solution in nitrobenzene of the polymer and time of efflux of pure nitrobenzene (at 30° C.) are measured and the ratio of the first to the second calculated) of the polyvinyl chloride polymer is substantially independent of all variables except reaction temperature. Thus, it is seen that the optimum temperature for the polymerization of vinyl chloride to obtain polymers of high molecular weight and to obtain reaction in a reasonable time appears to lie between 40 and 50° C. [The specific viscosity of polyvinyl chloride as conventionally produced is 0.50 to 0.55.] Thus, the process of this invention is susceptible of easy control since it is necessary only to control the reaction temperature and wide variations in catalyst concentration have no effect on molecular weight.

EXAMPLE 8

As a further example of the invention, the following mixture of materials, in which parts are by weight, was prepared and heated to 50° C. in a stirred stainless steel polymerization vessel:

| | |
|---|---|
| Vinyl chloride | 20 |
| Soft water | 22 |
| Glacial acetic acid | 45 |
| o,o'-Dichlorobenzoyl peroxide | 0.02 |

The vinyl chloride polymerized to a yield of 95% in 28 hours at 50° C. to form a polymer which had a specific viscosity of 0.48. It will be noted that the acetic acid medium in Example 8 was about 67% acetic acid by weight and the ratio of acetic acid solution to monomer was about 3.3 to 1. At the latter acetic acid monomer ratio the final slurry of polymer was thick but could easily be discharged from the vessel with the aid of a small quantity of water.

EXAMPLE 9

The following mixture of materials, in which parts are by weight, was charged to an evacuated polymerization vessel:

| | |
|---|---|
| Vinyl chloride | 100.00 |
| Glacial acetic acid | 240.00 |
| Soft water | 60.00 |
| o,o'-Dichlorobenzoyl peroxide | 0.75 |

The above materials were heated to 50° C. to start the reaction.

Polymerization was complete in 17 hours at 50° C. The product was a fine white slurry which was quite thick in consistency. The yield of polymer was 90 to 95% indicating that the use of an 80% acetic acid polymerization medium did not appreciably inhibit the reaction. The specific viscosity of the product was 0.40.

EXAMPLE 10

A mixture of 200 parts of 95% acetic acid, one hundred parts of vinylidene chloride and one part of dicaproyl peroxide was agitated at 50° C. A substantially complete yield of a fine, very white granular polymer was obtained.

EXAMPLE 11

It has been found that styrene and acrylic esters such as ethyl acrylate and methyl methacrylate or acrylic esters in combination with other monomers may be polymerized to complete conversion with an oil-soluble peroxide catalyst in aqueous acetic acid solutions of 80 to 100% strength. According to this example ethyl acrylate alone, methyl methacrylate alone, mixtures containing 90% ethyl acrylate and 10% vinyl chloride, and mixtures containing 50/50 methyl acrylate and butyl acrylate, 50/50 vinyl chloride ethyl acrylate, 70/30 ethyl acrylate-acrylonitrile, 70/30 ethyl acrylate-styrene, 80/20 styrene-vinylidene chloride, 80/20 ethyl acrylate-vinyl benzoate, and vinyl benzoate alone, were polymerized in the presence of 0.30% on the monomers of o,o'-dichlorobenzoyl peroxide in from 5 to 7 hours to form clear solutions of polymer which may be used as such or precipitated by addition of a non-solvent to obtain the polymer in the form of a very fine, white precipitate.

An unusual feature of the polymerization reactions of all the foregoing examples is that the reaction starts even before the temperature reaches 50° C.; that is, there is no observable "induction period."

The polymeric products obtained from the process of this invention may be compounded and used in the same manner as other polymers and copolymers. Plasticizers, pigments, stabilizers, and the like may be added directly to the polymer in dry form or may be mixed with the solid polymer on a hot roll mill, or, if preferred, may be added to a solution of the polymer in a volatile solvent. In addition, the compounding ingredients may be added to the polymerization mixture before or during polymerization.

The polymers produced by my new method of polymerization are possessed of unique properties of clarity and electrical resistance. The polymers may be dissolved in solvents, plasticizer added thereto along with stabilizers such as lead silicate and the solution cast, coated or deposited in the form of films and coatings which are unusual in their transparency and clarity. The resultant films are not milky or translucent as are films and coatings made from emulsion produced polymers. In addition, because the polymer is exceptionally free of electrolytic residues (there being present only an extremely minute quantity of peroxygen catalyst to furnish such electrolytic material) the electrical properties, heat and light stability and age resistance of the polymers are superior to polymers produced by ordinary emulsion techniques. The tensile strength, elongation and flexibility of the polymers produced by my process are equal to or superior to those conventionally produced.

By my new process of polymerizing vinylidene compounds, synthetic polymers of high molecular weight and excellent properties may be obtained at a rapid polymerization rate when only the acetic acid and peroxygen catalyst are employed in the polymerization. Polymerization of vinyl chloride, for example, may be accomplished by my method in 3 to 8 hours at 40 to 50° C. while processes of the art usually consume 20 to 40 hours or more. Moreover, the use of the aqueous acetic acid medium is not confined to vinyl chloride but it has been found that advantages are obtained with the other monomers of the class herein set forth. Accordingly, it is not intended that the invention be limited to the specific details of the specific examples, but rather that it be limited only by the spirit and scope of the appended claims.

I claim:

1. The method which comprises polymerizing a monomeric material comprising a major proportion of vinyl chloride in a two-phase reaction medium consisting of said monomeric material, an aqueous solution of acetic acid, and a polymerization catalyst, and at a temperature of from 0 to 100° C., said aqueous acetic acid solution containing from 60 to 80% by weight of acetic acid and being present in an amount from 2 to 4.5 times the amount of said monomeric material.

2. The method which comprises polymerizing vinyl chloride in a two-phase reaction medium consisting of vinyl chloride, an aqueous solution of acetic acid, and a peroxygen catalyst, and at a temperature of from 0 to 100° C., said aqueous solution of acetic acid containing from 60 to 80% by weight of acetic acid, and being present in an amount from 2 to 4.5 times the amount of vinyl chloride.

3. The method which comprises polymerizing vinyl chloride in a two-phase reaction medium consisting of vinyl chloride, an aqueous solution of acetic acid and o,o'-dichlorobenzoyl peroxide, and at a temperature of from 0 to 100° C., said aqueous solution of acetic acid containing 60% by weight of acetic acid and being present in an amount from 2 to 4.5 times the amount of vinyl chloride.

ROBERT J. WOLF.

REFERENCES CITED

The following references are of record in the file of this patent:

UNITED STATES PATENTS

| Number | Name | Date |
| --- | --- | --- |
| 2,300,566 | Hahn | Nov. 3, 1942 |
| 2,447,289 | Staudinger | Aug. 17, 1948 |

FOREIGN PATENTS

| Number | Country | Date |
| --- | --- | --- |
| 578,849 | Great Britain | July 15, 1946 |

OTHER REFERENCES

Kriston: Article in Plastics, (Chicago) (Dec. 1945), (Entire article pp. 40, 42, 43, 46, 115, and 116 with material relied upon pp. 42 and 43).